G. E. KELLY & G. F. ROYER.
TRAIN PIPE COUPLING.
APPLICATION FILED FEB. 7, 1907.

909,910.

Patented Jan. 19, 1909.

2 SHEETS—SHEET 1.

Witnesses

Inventors
George E. Kelly and George F. Royer
by
Foster Freeman Watson
Attorneys

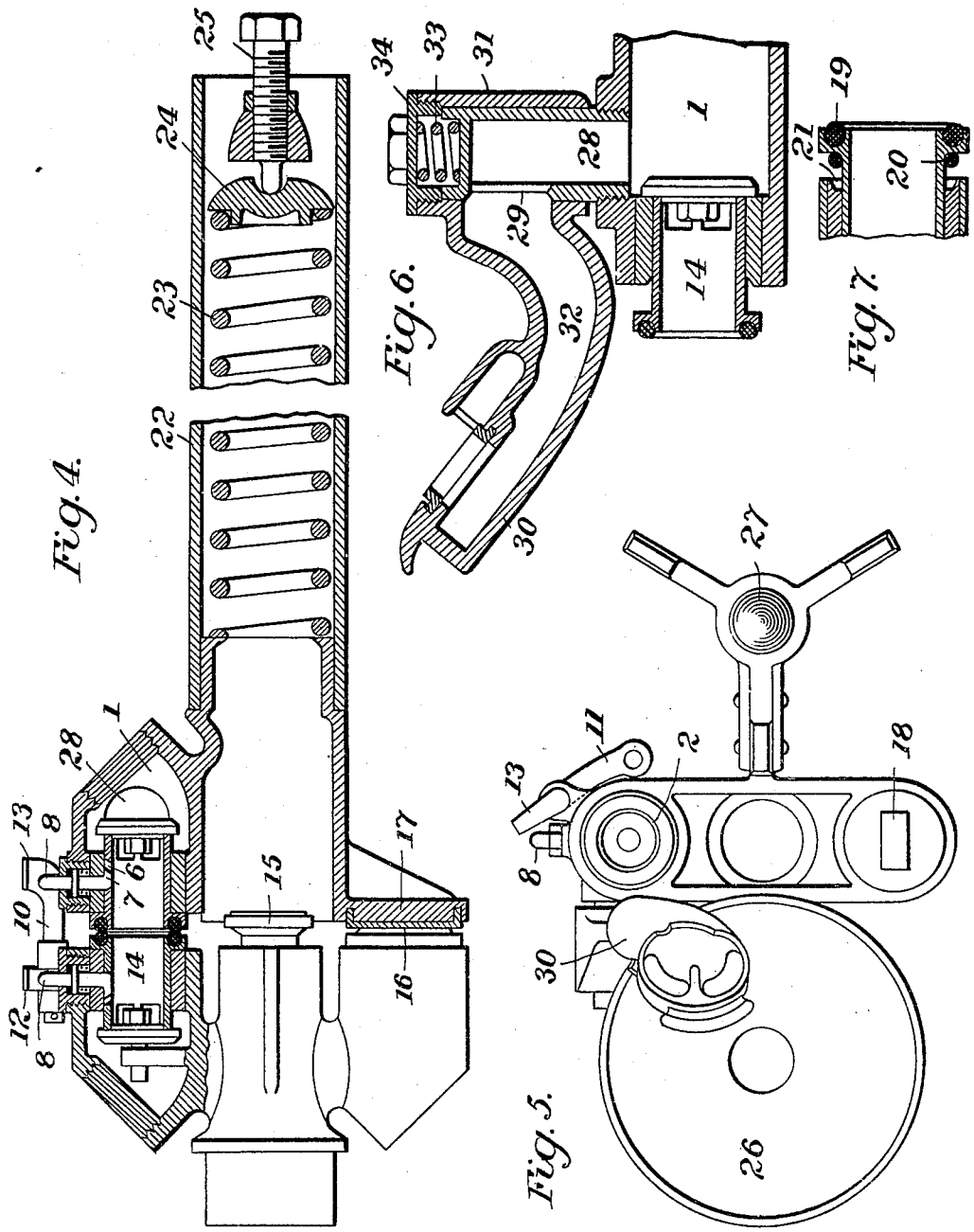

UNITED STATES PATENT OFFICE.

GEORGE E. KELLY AND GEORGE F. ROYER, OF WILKES-BARRE, PENNSYLVANIA.

TRAIN-PIPE COUPLING.

No. 909,910.      Specification of Letters Patent.      Patented Jan. 19, 1909.

Application filed February 7, 1907. Serial No. 356,287.

*To all whom it may concern:*

Be it known that we, GEORGE E. KELLY and GEORGE F. ROYER, citizens of the United States, and residents of Wilkes-Barre, county of Luzerne, State of Pennsylvania, have invented certain new and useful Improvements in Train-Pipe Couplings, of which the following is a specification.

The present invention relates to improvements in train pipe couplings and particularly to means for controlling the closing of the valves in such couplings.

It is customary to provide the fluid passages of such couplings with valves which are automatically opened as the members or heads of the coupling are engaged and to provide means whereby the valves controlling the brake mechanism are positively prevented from closing, whereby said conduits will be opened to the atmosphere and the brakes automatically set, if the members of the coupling are accidentally separated.

The particular object of this invention is to improve the stop or detaining device thus employed for holding said valve of the brake system open and also the means by which the valve may be released from said stop, or the latter rendered inoperative.

Figure 1:
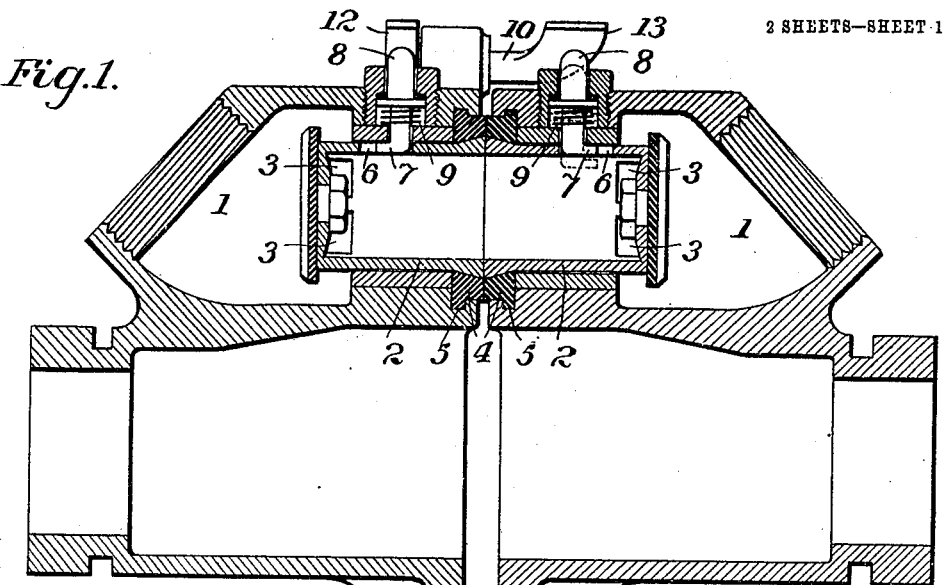
Figure 2:
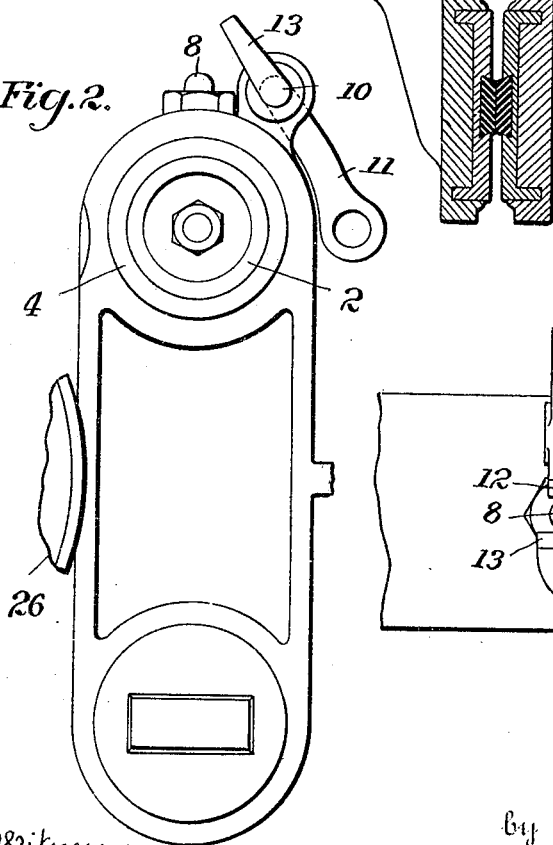
Figure 3:
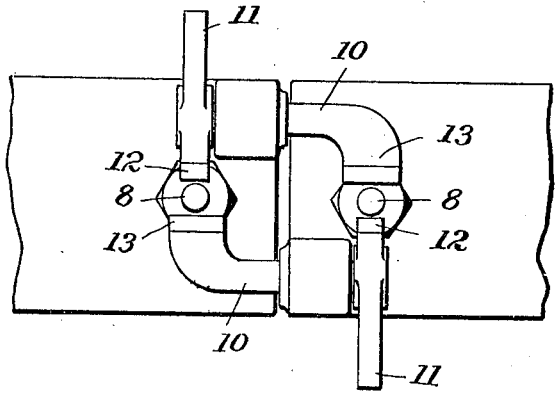

In the accompanying drawing: Figure 1 is a sectional view through a coupling constructed in accordance with the present invention; Fig. 2 is a face view of the body of one of the members of the coupling shown in Fig. 1; Fig. 3 is a plan view; Fig. 4 is a view similar to Fig. 1, showing the invention applied to two different styles of coupling; Fig. 5 is an elevation of one of the couplings shown in Fig. 4; Fig. 6 is a sectional view through the coupling shown in Figs. 4 and 5; and Fig. 7 is a detail view of one of the valves and its gasket.

The invention may be employed in connection with various forms of couplings, and is shown in the drawings as embodied in that form or type commonly employed on freight cars (in which there is but a single fluid conduit forming part of the brake mechanism), and also an embodiment in that type of coupling which is used on passenger cars, the latter including conduits forming parts of the heating and signaling systems, as well as that controlling the brakes.

Referring particularly to Figs. 1 and 2 of the drawings in which there is illustrated an embodiment of the invention adapted for use with freight cars, it will be seen that the coupling comprises two similar heads or members, each having a fluid passage 1 which forms a part of the automatic brake mechanism. As shown the passage 1 is formed in the upper part of the head and is provided with an interior valve 2, the head of which is exposed to the pressure of fluid in the passage which tends to move the valve toward its seat and maintain the passage closed.

The valve body is of such length that when the head thereof is engaging its seat in the coupling, and the lateral ports 3 therein are closed, the other end projects somewhat beyond the face of the coupling head.

As the two members or heads of the coupling are engaged, the valves 2 therein contact and are both forced inwardly carrying the heads thereof from the valve seats and uncovering both sets of ports 3, thus providing a continuous passage through the coupling.

Within a suitable recess formed in the face of the coupling head, and surrounding the outer end of the valve body, is arranged a flexible gasket 4 having at its inner end a flange 5 that extends behind a section of the head and thus holds the gasket against outward movement with the valve as the latter is closed.

The gasket is preferably made of the cross sectional form shown, the width or thickness thereof gradually increasing from its outer to its inner face and the outer end of the valve body is reversely tapered as shown. This form and arrangement of gasket and valve body, it will be noticed, insures a fluid tight joint between the valve body and the walls of the passage in the coupling head, and the gasket acts as a positive stop to the inward movement of the valve. By this arrangement the two valves 2 are uniformly moved inwardly as the members or heads of the coupling are engaged.

There is formed in the valve body a longitudinal slot 6 in which normally lies a toe or projection 7 at the inner end of a pin 8 that extends through a suitable chamber in the coupling. A spring 9 interposed between a wall of said chamber and a projection on the pin 8 acts to hold the latter in the position shown in full lines in Fig. 1, in which the toe 7 thereof is within the slot 6. With the stop, formed by the pin 8, in this position, it will be seen that the valve 2 is prevented from entirely closing the passage 1 and therefore if the members or heads of the coupling are separated, without adjusting said stop, the valve, under the pressure of the fluid in the passage, will move but a limited distance and not sufficient to close the ports 3. The escape of air through such partially closed ports will cause a setting of the brakes; and the action just described will occur whenever the members of the coupling are accidentally or unintentionally separated. When, however, the coupling members are intentionally disconnected it is desirable to allow the valves 2 to close instantly and therefore means are provided whereby the latter may be released from the stops 8.

As shown a rock shaft 10 is mounted in suitable bearings on each coupling head, each of said shafts being connected with a lever 11 to which a chain or other suitable pull device may be attached. Each rock shaft is provided with two arms 12, 13, adapted, as said shaft is rocked by its lever 11, to contact respectively with the outer ends of the pin 8 in the same head as that on which the shaft is mounted, and with that in the other coöperating head or member. Therefore, when it is desired to separate the coupling and allow the valves 2 therein to fully close, one of the levers 11 is moved to adjust the pins 8 into the position shown in dotted lines in Fig. 1, whereupon as soon as the members of the coupling are disconnected and separated, the pressure in the passages 1 will force the valves to their seats and completely close the ports 3 therein.

In Figs. 4 to 7 there is illustrated a slightly different embodiment of the invention, and the manner of supporting the sections of the coupler on the car is also illustrated.

In Figs. 4 to 6 a coupling member similar to that shown in Figs. 1 and 2 is shown as engaging with a different type of coupling, namely, such as that commonly employed on passenger cars, and which includes three conduits, adapted to be respectively connected with the brake, signal, and heating systems, said conduits being closed by valves 14, 15 and 16. These valves, like those previously described, are normally held in position to close said conduits by pressure, acting on their inner ends, and when the coupling members are engaged, the valve 14 will be moved from its seat, as shown, while the valve 15 controlling the signal duct will extend into the hollow section of the opposing coupling head, and thereby be retained in its closed position. The valve 16 of the heating system will bear against the plate 17 on the opposing coupling head, said plate having a projecting boss 18 which will be surrounded by the gasket at the outer end of the valve 16 so that a tight joint will be formed between said valve and the plate 17, and there will be no escape of steam from the heating conduit.

The valves shown in Figs. 4 to 6 differ slightly from those shown in the other figures, particularly as regards the form of the gasket. As shown most clearly in Figs. 4 and 7, each of said valves is provided at its outer end with a groove or recess in which is seated a ring 19. A similar elastic ring 20 surrounds the body of the valve in rear of the ring 19 and is adapted to be forced into an annular groove or recess 21 formed in the coupling head when the valve is opened, thus positively preventing any leakage between the valve and its supporting head.

The members of the coupling are so supported that they may yield longitudinally, one manner of so supporting them being illustrated in Fig. 4. Referring to this figure, it will be seen that the coupling head proper is provided with a tubular stem 22 within which is aranged a coil spring 23, one end of which bears against the coupling head, while the other end rests on an abutment 24. This abutment is adjustable by means of an adjusting screw 25, so that the tension or force of the spring 23 may be varied as required. The screw 25 extends through a bar that projects through slots in the tubular stem 22 and is connected with the car body in a manner well understood. That is, the abutment 24 is held relatively stationary and the spring 23 acts to normally hold the coupling head at the maximum distance therefrom. When, however, the coupling is in use the members thereof are moved toward their respective abutments, and the spring 23 thus placed under sufficient tension to maintain necessary engagement between the coupling heads. As shown in Fig. 5, the coupling heads are preferably provided with alining guides 26, 27, the former being in the shape of a hollow cone, while the latter consists of a suitable pin adapted to enter the conical guide 26 on the opposing coupling head.

Figs. 4 to 6 also illustrate a coupling head which may be attached or used in connection with the ordinary or commonly employed hose coupling. To accomplish this, the coupling head is provided with a laterally projecting hollow stud 28 which communicates with the brake conduit 1 at its inner end, and is provided near its outer end with an outlet or opening 29. A coupling head 30 similar in form to those commonly used with the flexible train pipes or hose sections of fluid pressure brake systems is provided with a sleeve 31 which surrounds said stud 28, and is adapted to be turned thereon to cause its passage 32 to communicate with or be cut off from the port 29. A spring 33 seated in a recess formed in the outer end of the post 28 and compressed by a screw plug or cap 34 carried by the sleeve 31 acts to hold said head 30 stationary on the stud 28 in either of its positions.

If it is desired to connect such a coupling as is shown in Figs. 4 to 6 with the ordinary hose coupling, the head 30 is engaged with the other corresponding coupling head and turned about the stud 28 until its passage 32 communicates with the port 29, when the conduit 1 will be in communication with the corresponding conduit of the other member.

Without limiting ourselves to the precise construction and arrangement of parts herein shown,

We claim as our invention:

1. In a train pipe coupling, the combination with a coupling head, a valve adapted to close a fluid passage in said head and arranged to be automatically opened when the coupling is in use and to be moved toward its seat by the pressure of the fluid in said passage, and a stop adapted to normally prevent said valve from closing, of a lever fulcrumed on the coupling head and adapted to adjust said stop to release the valve.

2. In a train pipe coupling, the combination with a coupling head, and a valve adapted to control a fluid passage in said head and to be automatically opened when the head is engaged with a similar head, of means adapted to automatically engage the valve when the latter is moved to open the passage and retain it in such open position, said means including a member extending to the outside of the coupling head by means of which the valve may be released.

3. In a train pipe coupling, the combination with a coupling head, and a valve adapted to control a fluid passage in said head and to be automatically opened when said head is engaged with a similar head and moved toward its seat by pressure of the fluid in said passage, of a stop adapted to automatically engage the valve when the latter is moved to open the passage and retain it in such open position, and means for releasing said stop.

4. In a train pipe coupling, the combination with a coupling head, and a valve adapted to control a fluid passage in said head and to be automatically opened when said head is engaged with a similar head and to be closed by pressure of fluid in said passage, of a stop mounted in the coupling head and movable to and from the valve, means for automatically moving said stop into position to prevent closing of the valve when the latter is adjusted to open the fluid passage, and means for releasing said stop.

5. In a train pipe coupling, the combination with a coupling head, a valve adapted to close a fluid passage in said head and arranged to be automatically opened when the coupling is in use and to be moved toward its seat by the pressure of the fluid in said passage, and a stop adapted to normally prevent said valve from closing, of a rock shaft mounted in bearings on the coupling head and having at one end an arm adapted as the shaft is rocked to engage said stop and move it from the path of the valve, and means for rocking said shaft.

6. In a train pipe coupling, the combination with a coupling head, and a valve arranged within a fluid passage in said head and adapted to be automatically moved from its seat when the coupler is in use and to be moved toward its seat by the pressure of fluid in said passage, of a stop mounted in the coupling head and extending into a slot in the valve body to limit the closing movement of the valve, and means for moving said stop out of engagement with the valve.

7. In a train pipe coupling, the combination with a coupling head, and a valve arranged within a fluid passage in said head and adapted to be automatically moved from its seat when the coupler is in use and to be moved toward its seat by the pressure of fluid in said passage, of a stop mounted in the coupling head and adapted to normally permit a limited movement of the valve toward its seat when the coupling is broken, and means for adjusting said stop to permit a complete closing of the valve.

8. In a train pipe coupling, the combination with a coupling head, and a valve arranged within a fluid passage in said head and adapted to be automatically moved from its seat when the coupler is in use and to be moved toward its seat by the pressure of fluid in said passage, of a stop mounted in the coupling head and having at its inner end a toe or projection adapted to engage the valve and prevent the closing thereof when the coupler is disconnected, and means for forcing said stop inwardly to disengage the toe or projection thereof from the valve.

9. In a train pipe coupling, the combination of two heads provided in their opposing faces with alined fluid passages, valves arranged in said passages and adapted to be automatically opened as said heads are connected, stops for limiting the closing movements of said valves, a rock shaft mounted on one of said heads and provided with arms adapted to move both stops from engagement with the valves, and means for rocking said shaft.

10. In a train pipe coupling, the combination of two heads provided in their opposing faces with alined fluid passages, valves arranged in said passages and adapted to be automatically opened as said heads are connected, stops for limiting the closing movements of said valves, a rock shaft mounted in bearings on each head and provided with two arms adapted to actuate both stops to release the valves, and means for rocking either of said shafts.

11. In a train pipe coupling, the combination with a coupling head, and a valve arranged within a fluid passage in said head and adapted to be automatically moved from its seat when the coupler is in use and to be moved toward its seat by the pressure of fluid in said passage, of a pin mounted in the coupling head and having its outer end projecting beyond said head and having at its inner end a toe or projection that extends into a slot in the valve and acts to normally prevent the valve from closing, a spring acting to hold said pin in position to thus intercept the valve, and means for forcing the pin inwardly, against the action of the spring, to release the valve.

12. The herein described train pipe coupling head comprising a body having a fluid passage therein provided with an inlet and two outlets, a valve for one of said outlets adapted to be automatically opened when the head is engaged with a similar head, and a hose coupling member connected with and adapted to be manually adjusted to open or close the other outlet.

13. In a train pipe coupling, the combination with a coupling head provided with a fluid passage and having a valve adapted to automatically open said passage when the head is engaged with a similar head, of a supplemental coupling adapted to be bodily adjusted to open and close a port communicating with said fluid passage and adapted to be connected with a hose coupling, substantially as and for the purpose described.

14. In a train pipe coupling, the combination with a coupling head provided with a fluid passage having therein a valve adapted to be automatically opened when the head is engaged with a similar head, of a supplemental coupling adjustably mounted on said head and adapted to be connected with a hose coupling, and to be adjusted to open and close a port leading from the fluid passage in the coupling head, substantially as and for the purpose described.

15. In a train pipe coupling, the combination with a coupling head provided with a fluid passage having therein a valve adapted to be automatically opened when the head is engaged with a similar head, of a branch conduit permanently connected with the fluid passage in said head, and a supplemental hose coupling revolubly supported on and adapted to be adjusted to open or close a port in the branch conduit, substantially as and for the purpose described.

16. In a train pipe coupling, the combination with a coupling head provided with a fluid passage having therein a valve adapted to be automatically opened when the head is engaged with a similar head, of a supplemental hose coupling adapted to be adjusted to open or close a port communicating with the fluid passage in rear of said valve, substantially as and for the purpose described.

17. In a train pipe coupling, the combination with a coupling head provided with a fluid passage and having a valve at the outer end of said passage, of a tubular stud connected with said head and communicating with the fluid passage therein in rear of said valve, and a hose coupling revolubly mounted on said stud and adapted to be turned thereon to bring its passage into or out of alinement with a port therein.

18. In a train pipe coupling, the combination with a coupling head provided with a fluid passage and having a valve at the outer end of said passage, of a tubular stud connected with said head and communicating with the fluid passage therein in rear of said valve, a hose coupling revolubly mounted on said stud and adapted to be turned thereon to bring its passage into or out of alinement with a port therein, and a spring arranged between said stud and hose coupling and adapted to hold the latter in either adjusted position.

In testimony whereof we affix our signatures in presence of two witnesses.

GEORGE E. KELLY.
GEORGE F. ROYER.

Witnesses:
EDWARD N. NOLL,
JOHN J. O'DONNELL.